United States Patent [19]

Cowlin

[11] Patent Number: 4,981,205
[45] Date of Patent: Jan. 1, 1991

[54] CARRIAGE AND APPARATUS FOR TRANSPORTING ARTICLES

[75] Inventor: Simon Cowlin, Kelsale, England

[73] Assignee: Lockwood Graders (UK) Limited, Chelmsford, England

[21] Appl. No.: 277,668

[22] Filed: Nov. 29, 1988

[30] Foreign Application Priority Data

Nov. 30, 1987 [GB] United Kingdom ............... 8727994

[51] Int. Cl.$^5$ ............................................ B65G 17/32
[52] U.S. Cl. ................................... 198/387; 198/384
[58] Field of Search ............... 198/384, 385, 386, 387, 198/388, 379, 365, 465.1, 465.2, 779; 209/912, 701, 698

[56] References Cited

U.S. PATENT DOCUMENTS

| | | | |
|---|---|---|---|
| 2,769,521 | 11/1956 | Hait . | |
| 2,830,531 | 4/1958 | Tarlton | 198/384 X |
| 2,853,108 | 9/1958 | Hait | 198/387 X |
| 2,895,589 | 7/1959 | Rostron | 198/387 |
| 2,907,440 | 10/1959 | Hait | 198/387 |
| 3,075,629 | 1/1963 | Gibbs | 198/384 |
| 3,575,292 | 4/1971 | Roda | 209/912 X |
| 3,653,489 | 4/1972 | Tullis et al. . | |
| 3,945,489 | 3/1976 | Paddock et al. . | |

FOREIGN PATENT DOCUMENTS

| | | | |
|---|---|---|---|
| 0101842 | 8/1937 | Australia | 198/379 |
| 0591035 | 1/1960 | Canada | 198/387 |
| 0144480 | 9/1923 | Fed. Rep. of Germany | 198/365 |
| 2007439 | 10/1970 | Fed. Rep. of Germany . | |
| 479972 | 11/1936 | United Kingdom . | |
| 1176396 | 10/1970 | United Kingdom . | |
| 1374067 | 11/1974 | United Kingdom . | |
| 1504997 | 3/1978 | United Kingdom . | |

Primary Examiner—Joseph E. Valenza
Assistant Examiner—James R. Bidwell
Attorney, Agent, or Firm—Cushman, Darby & Cushman

[57] ABSTRACT

Apparatus for transporting articles (32) includes a plurality of spaced, substantially parallel axles (4) coupled for movement by an endless chain drive. Each axle (4) extends substantially transversely to the direction of movement and has a number of carriages (2) coupled thereto. The carriages (2) are spaced along, and pivotably mounted on the respective axle (4). Each carriage (2) has a skid member (10) supporting two pairs of wheels, the first pair of wheels being carried by the respective axle (4). The articles are supported on the wheels (6,8) as the carriages are pulled along on their skid members (10) over an appropriate support. If it is required to inspect the articles, the wheels are brought into contact with elongate support members (20, 22) so that they are rotated and thereby rotate the article carried thereby. Deposit of an article is achieved by removing support from the respective carriages (2) so that the carriage pivots relative to said axle (4).

31 Claims, 4 Drawing Sheets

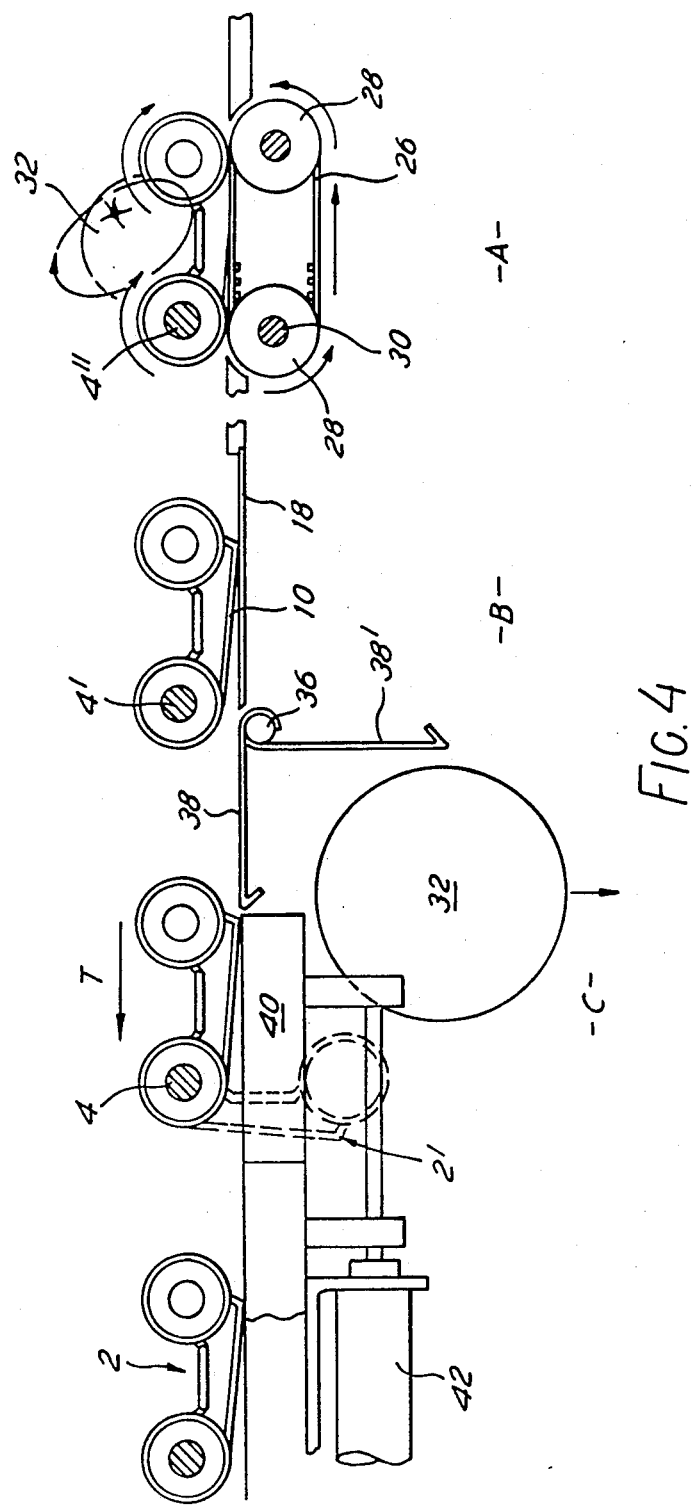

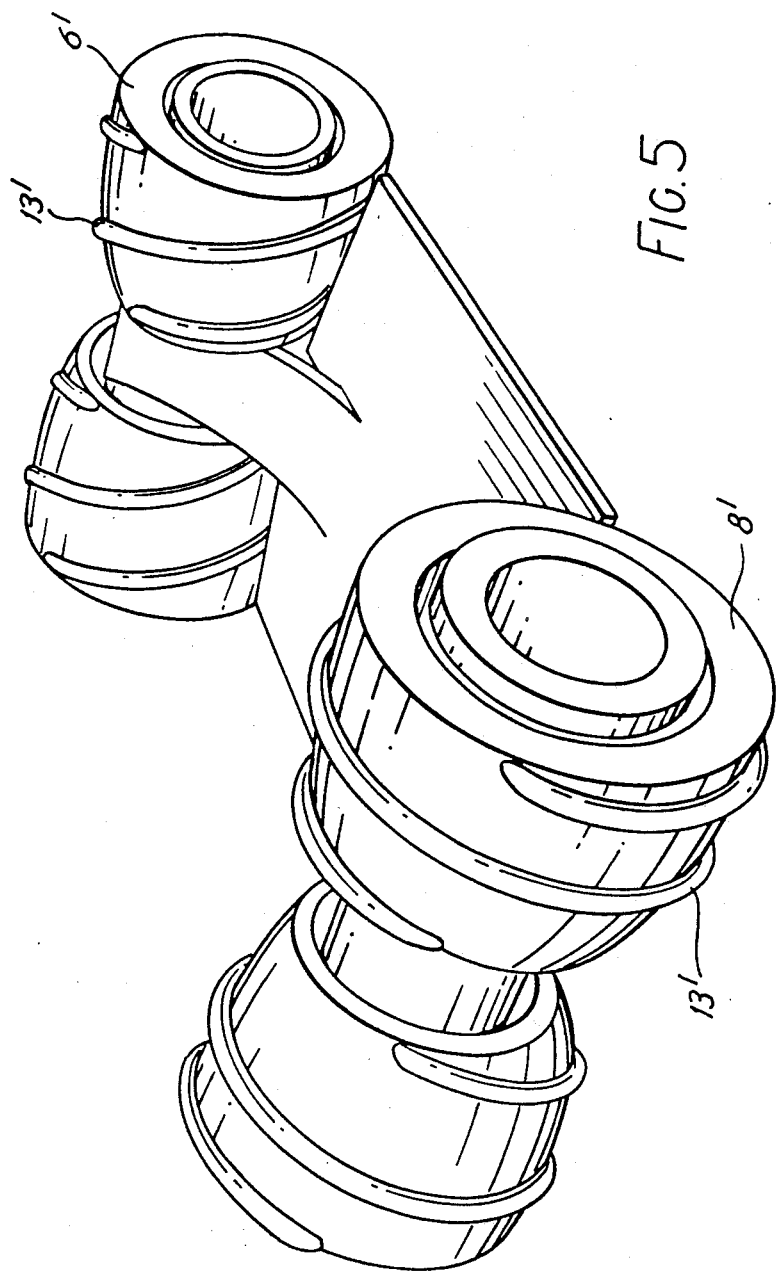

CARRIAGE AND APPARATUS FOR TRANSPORTING ARTICLES

BACKGROUND OF THE INVENTION

1. Field of the Invention

The present invention relates to a carriage and apparatus for transporting acticles.

2. Description of the Prior Art

Present apparatus for conveying and sorting fruit and vegetables generally includes a roller table not only for conveying the articles but also for causing them to rotate such that the whole periphery of the articles can be effectively inspected either by eye or by a scanning system, for example utilizing a television camera.

However, the articles transported by a roller table lie in the gaps between adjacent rollers, and, before they can be sorted, the articles have to be removed from the gaps between the rollers so that different articles can be routed differently.

It is also known to transport acticles in individual containers or carriages. However, it is necessary to singulate the articles when feeding them to the transport apparatus to ensure that only a single article is fed to each container, and furthermore the containers have to be sized to fit the articles being transported.

SUMMARY OF THE INVENTION

According to a first aspect of the present invention there is provided a carriage for transporting articles comprising first and second pairs of wheels, the wheels in each pair being arranged coaxially, and the axes of the two pairs being substantially parallel and spaced, and a skid member arranged to support the two pairs of wheels and to connect them, the skid member being arranged such that a channel extends through the carriage between the two pairs of wheels.

It has been found that carriages of the invention can successfully carry articles of many different shapes and sizes.

Preferably, said skid member defines a skid support surface which protrudes downwardly of at least one pair of said wheels. The skid support surface may protrude downwardly of both pairs of wheels whereby said carriage may be supported on said skid support surface.

In an embodiment, the skid member extends from between the first pair of wheels to between the second pair of wheels, and wherein the width of the skid member in the direction along said channel is less than or equal to the spacing between each pair of wheels.

Preferably, the diameter of the preipheral surface of each wheel increases outwardly of the carriage. By this means, the peripheral surfaces of each pair of wheels together define a dish-shaped surface for supporting an article.

In an embodiment, the peripheral surface of each wheel is serrated, corrugated or screw threaded. This enables engagement of the wheels by correspondingly serrated, corrugated or screw threaded drive means to enable the speed and direction of rotation of the wheels to be chosen as required. The engagement means on the surfaces of the wheels can also assist engagement between the wheels and an article carried thereby.

The invention also extends to apparatus for transporting acticles comprising a plurality of carriages, and means for moving the carriages along a predetermined direction of movement, wherein each said carriage is as defined above, and wherein the axes of the two pairs of wheels of each carriage extend substantially transversely to the direction of movement.

According to a further aspect of the present invention there is provided apparatus for transporting articles comprising a plurality of carriages, and means for moving the carriages along a predetermined direction of movement, wherein each said carriage comprises first and second pairs of wheels, the wheels in each pair being arranged coaxially, and the axes of the two pairs extending substantially transversely to the direction of movement and being spaced along the direction of movement, and a skid member for supporting said first and second pairs of wheels, the skid member being arranged such that the peripheral surfaces of the wheels form article supporting surfaces, and such that a channel extending substantially transversely to the direction of movement extends through the carriage between the two pairs of wheels.

With apparatus of the invention it is ensured that each individual carriage is smaller than the articles to be carried. It is not then necessary to singulate articles as they are fed onto the apparatus as they are able to spread out along the channels in much the same way as with current roller beds.

However, as more than one article cannot be carried by a single carriage, it is only necessary to pivot that carriage, and perhaps adjacent ones, to reliably divert a single article out of the transport path. Furthermore, the wheels, which act as article support surfaces, can be rotated whereby the whole periphery of each article can be made available for scanning.

Preferably, the apparatus further comprises support means over which the carriages are arranged to be moved. For example, the support means may comprise at least one support selectively movable from a position supporting selected carriages to a second position in which said carriages are unsupported.

In an embodiment the means for moving the carriages comprises a plurality of axles extending substantially transversely to the direction of movement. The carriages are each coupled to one of the axles for movement therewith, for example, each skid member is pivotably mounted on one of the axles. Preferably, said plurality of axles are coupled to at least one endless chain to form an endless conveyor, and a plurality of carriages are pivotably mounted on each said axle, the carriages carried by each axle being spaced along the respective axle across the width of the conveyor.

In a preferred embodiment each said carriage has a first pair of wheels pivotably mounted on one said axle. The skid member of each carriage may extend from between said first pair of wheels to between the second pair of wheels, the width of the skid member in the direction transverse to the direction of motion being less than or equal to the spacing between each pair of wheels. In addition, the skid member preferably extends downwardly of all of the wheels and is arranged such that the carriage may be supported on support means by the skid member without any of the wheels coming into contact with the support means. A cover member extending between said first and second pairs of wheels and over the skid member may also be provided.

The apparatus preferably further comprises support means for the carriages. In an embodiment the support means comprises a plurality of elongate support members spaced across the transverse extent of the conveyor, the spacing between adjacent support members being large enough to receive the skid member of a respective carriage such that the wheels of that carriage run along two spaced adjacent support members. Alternate support members may be fixed and adjacent support members movable.

To enable deposit of the articles, support means for supporting the carriages as they are moved thereover are provided. Preferably, at least one opening is formed in said support means over which a plurality of longitudinally extending, transversely spaced support fingers are provided, each finger being movable between an extended position in which it supports a respective carriage, and a retracted position in which the respective carriage is free to pivot relative to its axle.

The invention also extends to apparatus for carrying and enabling rotation of articles, said apparatus comprising at least one carriage having first and second pairs of wheels, the wheels in each pair being arranged coaxially, and the axes of the two pairs being substantially parallel and spaced, and a skid member for supporting said first and second pairs of wheels, support means for the or each carriage, and means for moving the or each carriage over said support means, wherein one or more of the wheels of the or each carriage is arranged to contact the support means during the movement of the carriage thereover whereby rotation is imparted to the contacted wheels.

In an embodiment, the means for moving the carriages comprises at least one axle extending substantially transversely to the direction of movement, along which the carriages are spaced, and to which the carriages are coupled, and wherein said support means comprises a plurality of transversely spaced, elongate support members, the spacing between adjacent support members being large enough to receive the skid member of a respective carriage such that the wheels of that carriage run along two spaced adjacent support members.

BRIEF DESCRIPTION OF THE DRAWING

Embodiments of the present invention will hereinafter be described, by way of example, with reference to the accompanying drawings, in which;

FIG. 4 illustrates a side elevation of the transporting apparatus of FIG. 3, and FIG. 5 shows a perspective view of an alternative embodiment of a carriage for a transporting apparatus.

DETAILED DESCRIPTION OF THE PRESENTLY PREFERRED EXEMPLARY EMBODIMENT

Figure 3:
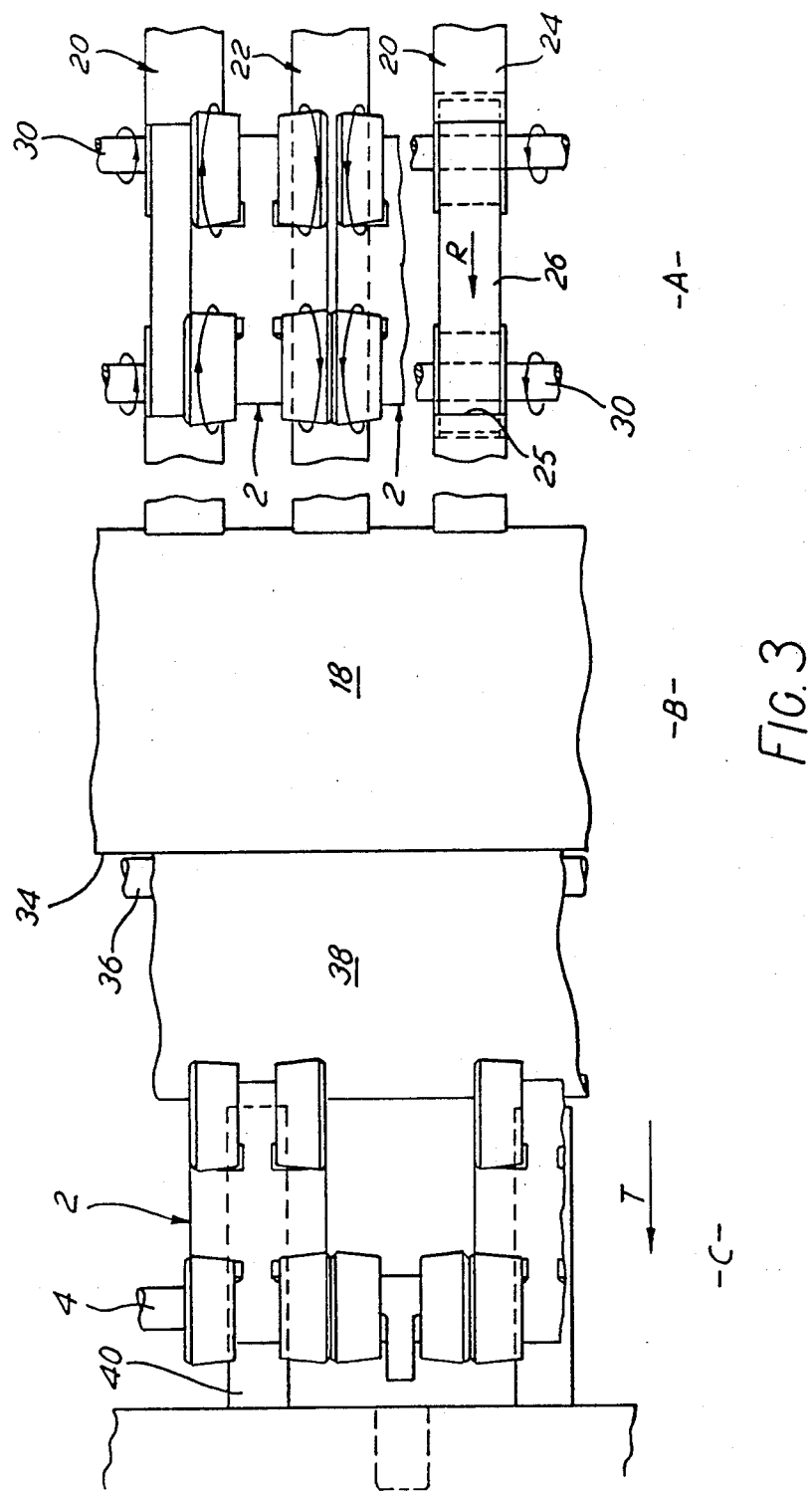
FIG. 3 shows a plan view from above of part of the transporting apparatus illustrating a number of stations thereof.

The apparatus illustrated in FIGS. 3 and 4 is for transporting articles, and has particular application to the transporting of agricultural produce, such as fruit and vegetables. The apparatus is arranged to transport rows of articles and enables the rotation of the articles such that their entire periphery can be inspected. As will become apparent, the apparatus also enables the selective deposit of the articles being transported and hence, can be used to sort the articles in accordance with predetermined criteria.

Figure 1:
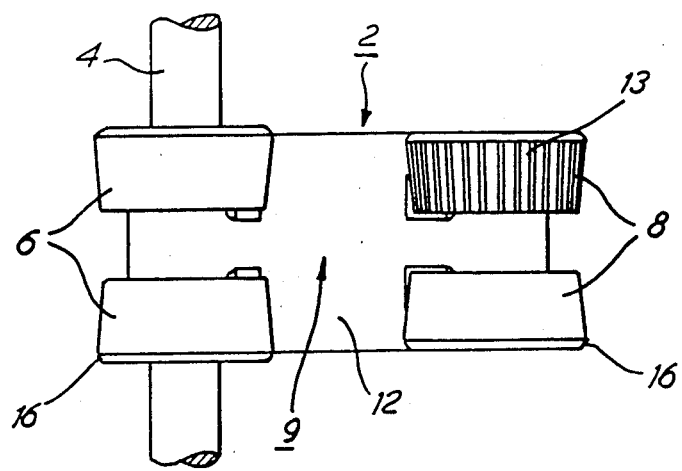
FIG. 1 shows a plan view from above of a carriage for a transporting apparatus.
Figure 2:
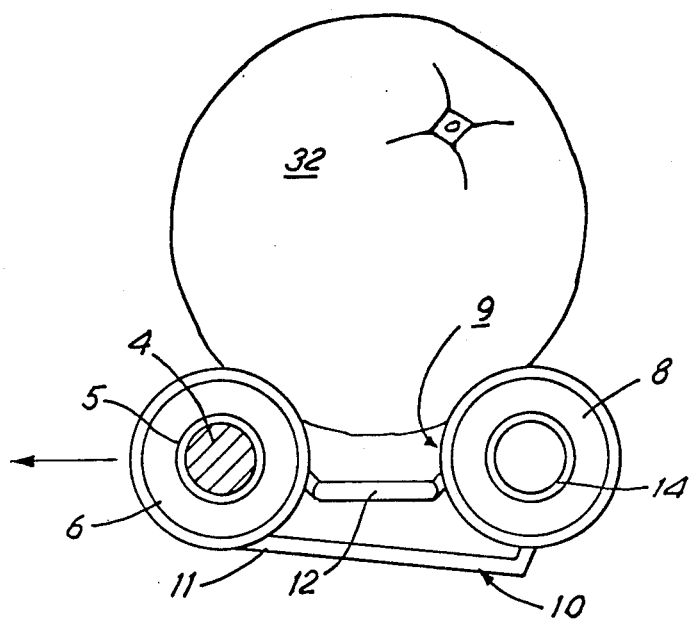
FIG. 2 shows a side elevation of the carriage of FIG. 1.

FIGS. 1 and 2 illustrate an individual carriage 2 of the transporting apparatus which is arranged to carry, to enable the rotation, and to subsequently selectively deposit an article 32.

Each carriage 2 is preferably formed as a one-piece moulding including a cranked lower rib or skid member 10 and a top cover member 12. A pair of coaxial, axially spaced wheels 6 are mounted at the front of the carriage 2, and a pair of coaxial, axially spaced wheels 8 are mounted at the rear. The common axis of the two rear wheels 8 extends substantially parallel to that of the two front wheels 6. The hubs 5 of the wheels 6 of the first pair are connectd together and to the hubs 14 of the wheels 8 of the second pair by way of the skid member 10. The hubs 5, 14 of the wheels of each pair are also connected together and to the other pair by way of the cover member 12. The carriage 2 is journaled onto an axle 4, coaxial with the front wheels 6, so that the whole carriage is pivotable with respect to the axle 4. Of course, the wheels 6 are rotatable relative to their hubs 5, and therefore alos rotatable relative to the axle 4. Similarly, the rear wheels 8 are rotatable relative to their hubs 14.

It will be seen from FIGS. 1 and 2 that the wheels 6 and 8 are all shaped and mounted such that the diameter of each wheel progressively increases outwardly from its internal edge. The peripheral surfaces, which are article supporting surfaces, of each pair of wheels 6, 8 together define a dish-shaped surface which inhibits spherical or near spherical shaped articles from moving outwardly of the carriage. At their outward edges, the periphery of each wheel is chamfered as indicated at 16. It has been found that this particular wheel shaping is advantageous when each carriage is to be used to carry an article having an approximately spherical external periphery.

It will be seen that the skid member 10 and the cover member 12 are arranged such that a channel 9 extends through the carriage 2 between the pairs of wheels 6, 8. This gives the carriage an open-sided construction enabling it to carry articles substantially larger than itself. Furthermore, it will be seen that the skid member 10 defines a skid support surface 11 which protrudes downwardly of both pairs of wheels 6, 8 whereby the carriage may be supported on the skid support surface 11 alone. It would alternatively be possible to arrange for the skid support surface 11 to to protrude downwardly of only one pair of wheels 6 or 8.

In the embodiment illustrated in FIGS. 1 and 2 the peripheral surfaces of the wheels 6, 8 are serrated as indicated at 13. These serrations can, as will be seen below, be used to engage corresponding serrations on drive means for the wheels. In addition, the serrations 13 can assist in engaging articles carried by the carriage.

In the transporting apparatus shown in FIGS. 3 and 4, a plurality of the carriages 2 are journaled onto, and axially spaced, along the length of a single common axle 4. This axle 4 is connected to be moved by one or more endless chain conveyors (not shown). For example, the two ends of the single common axle 4 can be engaged with corresponding links of two endless chain conveyors arranged substantially parallel to each other. A number of further axles $4^1$, $4^{11}$, etc., extending mutually parallel to each other and to said first axle 4 are similarly attached to the conveyors. Each of these further axles $4^1$, $4^{11}$, etc., similarly pivotably supports a plurality of the carriages 2. It will therefore be appreciated that the axles 4, $4^1$, $4^{11}$, and their carriages 2 together form an endless conveyor having a chain conveyor drive. Of course, alternative drive means could be provided if required.

In the embodiment illustrated, the top run of the endless conveyor formed by the axles 4, 4¹, 4¹¹, and their carriages 2 is driven to move in the direction T over a support. The configuration of this support differs at various locations along the top run of the conveyor defining a number of individual stations, A, B, and C, therealong.

At station B, the support is constituted by a simple support plate 18 extending over the transverse width of the apparatus. It will be appreciated that as each axle 4 is moved across this support plate 18, the row of carriages 2 spaced along this axle are supported on the plate 18 by way of their respective skid members 10, and are pulled over the support plate 18 by sliding movement of the skid members 10 thereover. In this condition, the wheels 6 and 8 of each carriage 2 are spaced above, and are not in contact with, the support plate 18. Articles 32 can be carried by the carriages 2 supported by their wheels, 6, 8.

If required, an array of load cells (not shown) could be incorporated in the support, for example, in the support plate 18, such that the carriages are slid over the load cells. By this means, information as to the weight of articles carried by the carriages can be obtained.

At station A, the support is designed to cause rotation of the wheels of each carriage 2 to thereby rotate articles supported by the wheels. In this respect, the support at station A is comprised by a plurality of elongate support members 20, 22, whose longitudinal extent is substantially parallel to the direction of travel T. The width of these support members and their spacing is arranged such that the front and back wheels on one side of each carriage contact one of these members 20, 22, while the other two wheels on the other side of the carriage contact a different support member. That is, each carriage straddles two adjacent support members 20, 22, with its skid member 10 received in the gap between said two adjacent support members. It will be appreciated that, as the wheels of the carriage are now in contact with the support members, moving the carriage along, the support members causes the wheels 6, 8 to rotate.

It would be possible for all of the support members 20, 22, to be constituted by a plurality of identical, fixed, spaced, elongate strips. In this instance, all of the wheels of each carriage would be rotated in the forward direction of movement as the carriage is pulled along the strips. It will also be appreciated that any article supported by the wheels of a carriage would be rotated by the rotation of the wheels.

However, if all of the wheels of each carriage are rotated in the same manner direction, the articles carried thereby are generally only caused to rotate about a singel axis. If the station A of the transporting apparatus is to form an inspection zone, it is generally required that the whole surface of each article be made available for inspection. This is achieved in the embodiment illustrated because the support members 20 comprise moving band conveyors arranged to rotate the wheels at one side of each carriage differently, for example, in the opposite direction or at a different speed, to the rotation of the wheels at the other side of that same carriage. These moving support members 20 are arranged alternately with fixed support members 22 in the form of fixed, elongate strips.

In this respect, each alternate support member 20 comprises an elongate plate 24 interrupted to define a gap 25 in which the upper run of a moving band conveyor is arranged. The conveyor has an endless band 26 rotatable around and by way of two sprocket wheels 28. Each such sprocket wheel is mounted on a rotatable shaft 30. It will be seen from FIG. 3 that all of the band conveyors are axially aligned and use common spaced shafts 30. In use, each movable band conveyor is moved, by rotation of its wheel 28, in a directin R which is parallel to the direction of travel T of the transporting apparatus. In this case, as shown in FIG. 3, while the wheels 6, 8 on one side of a carriage, which run along one of the fixed strips 22, rotate in the forward direction, the wheels 6, 8, on the other side of the carriage, which contact the moving band 26, rotate in the rearward direction.

As is indicated in FIG. 4, this differential rotation of the wheels of each carriage 2 causes the article 32 carried thereby to rotate about more than one axis such that more of the surface of the article becomes available for inspection.

Although the embodiment illustrates the use of moving band conveyors, it will be appreciated that other means may be provided to cause differential rotation of the wheels of each carriage. For example, the carriages could be pulled over slidable support plates or any other type of movable support. It is particularly useful for the movable or fixed supports to be serrated to engage with the serrations 13 on the wheels 6, 8 of the carriages as this enables positive drive to be imparted to the wheels which can thereby be driven in the direction and at the speed which is required. Furthermore, it is not necessarily required to rotate the two wheels on one side of each carriage in the opposite direction to the wheels on the other side of the carriage. Other differential rotations can be achieved and may be required.

The apparatus illustrated in FIGS. 3 and 4, is arranged for use for the automatic sorting of articles. It has been found that this apparatus can successfully enable the singulation, inspection and sorting of a wide variety of articles without hand asistance being necessary. In use, articles to be sorted are initially fed to the apparatus at a feeding station (not shown) upstream in the direction of travel T. Any suitable feed means for feeding articles in rows to the rows of carriages 2 can be utilized. The articles are moveable along the rows of carriages and the articles spread out until each article is carried by a respective, individual carriage. The wheels 6, 8 are caused to rotate, and this, and their shaping spreads the articles, and, as the carriages are small compared to the articles, it is ensured that no carriage carries more than one article. This means that singulation means are not required. Of course, where the articles are particularly large compared to the carriages, or particularly elongate, each article may be carried by two or more adjacent carriages.

Each row of carriages 2, and the articles carried thereby, are moved in turn through an inspection region which may be constituted simply by the station A illustrated. However, if necessary a longer inspection region may be provided. Clearly, the length of the inspection region, and the length of time during which the articles are to be inspected, will depend upon a number of factors including the sort of inspection techniques to be used and the number of criteria which need to be determined. Thus, it may be sufficient to move the carriages over a station (not illustrated) where a plurality of elongate, spaced, fixed support strips are provided, and then to move them over station A in which fixed support members 22 are alternated with movable support members 20. Additionally, or alternatively, an inspection station could be provided in which all of the support members are movable. Additionally or alternatively, each alternate support member, or all of the support members, may be interrupted one or more times along its length for the interposition of a moving band conveyor.

Clearly then, the inspection region is suitably arranged such that rotation of the wheels of the carriages causes the required rotation of the articles to enable appropriate inspection of the peripheral surface of the articles.

It has been found that, where required, appropriate differential rotation of individual wheels of a carriage can enable substantially all of the surface area of such disparate articles as lemons, grapefruit and potatoes to be made available for inspection.

FIG. 5 shows a perspective view of an alternative embodiment of a carriage $2^1$ whose wheels $6^1$ and $8^1$ each carry a screw thread $13^1$ on their peripheral surfaces. It has been found that, together with the differential rotation imparted to the wheels $6^1$, $8^1$, these screw threads assist in causing rotation of the articles about horizontal axes.

Generally, data processing means (not shown) will be provided, to receive the information obtained in the inspection region, for example, by way of a scanning camera, and to cause the articles to be routed differently in accordance with the information obtained from the inspection.

The articles are sorted, that is, routed differently as required, at station C of the transporting apparatus. It will be appreciated that, once the articles have been inspected, it is necessary to ensure that as they are moved from station A to station C that they do not change location relative to one another or relative to any fixed points used by the data processing means to keep track of the inspected articles. Generally, the carriages are moved from station A to station C without rotating their wheels so that the articles remain on their original carriages. Of course, appropriate rotation could be imparted to the wheels if this was necessary in any particular case to prevent relative motion between articles.

At station C, selected ones of the articles are deposited by the apparatus. At station C the support for the conveyor is interrupted to form an opening 34 along whose upstream, transversely extending edge extends a transverse shaft 36. The shaft 36 supports a flap 38 whose transverse width is at least the same as the combined width of all of the carriages coupled to a single axle 4. The flap 38 is mounted to pivot from a substantially horizontal position, in which it acts as a support surface, to a retracted position, as indicated by the flap $38^1$ in FIG. 4, in which it extends substantially vertically downwardly. Movement of the flap 38 between these two positions can be achieved as required. In an embodiment, the movement of the flap is arranged to be caused by reciprocation of a crank (not shown) connected to the shaft 36 by way of of a cam (not shown).

It will be seen that the flap 38 only extends over substantially half the length of the opening 34. In this respect, a bank of fingers 40 are spaced transversely across the conveyor. Each finger 40 extends substantially horizontally over the opening 34 and is longitudinally reciprocable in a substantially horizontal plane between an extended support position in which the free end of the finger 40 approaches the transverse free edge of the flap 38, and a retracted position in which the free end of the finger 40 is withdrawn beyond the downstream end of the opening 34. It will be appreciated that with the flap 38 positioned substantially horizontally, and with each of the fingers 40 in their extended positions, as a respective axle 4 is moved across the opening 34, each of its carriages will be supported first by the flap 38 and then by respective fingers 40. In this respect, the fingers 40 are arranged such that the skid member 10 of each carriage 2 is supported by a respective finger 40.

For simplicity of control, it is preferred that the flap 38 be periodically lowered from its horizontal position to its vertical position and then returned. On each cycle, the flap 38 remains in its horizontal position, while an axle 4 and the carriages coupled thereto move over the flap. However, as the axle moves further downstream of the flap 38, the downward movement of the flap is commenced. Of course, at this point, the support of the carriages is taken over by the fingers 40. Accordingly, if deposit of any article is not required it is sufficient simply to leave the appropriate finger or fingers 40 in place. Conversely, to cause a selected article to be deposited, the finger or fingers 40 supporting its carriage or carriages is retracted. As each finger is withdrawn, removing support from beneath the respective carriage, the carriage 2 pivots about the axle 4, as indicated by the carriage $2^1$ in FIG. 4. The withdrawal of the finger or fingers 40, together with the lowering of the flap 38, causes deposit of the selected article. It will be seen that the lowering flap 38 tends to guide the article during its deposit and this protects the articles, particularly those articles which are susceptible to damage.

Reciprocation of each finger 40 is under the control of a respective pneumatic actuator 42.

In the illustrated embodiment, only a single opening 34 with its associated bank of fingers 40 is illustrated. However, it will be appreciated that a plurality of stations, as C, can be provided to sort the articles 32 into a number of categories.

The timing of the periodic lowering of each flap and the triming of the reciprocation of the fingers can be done by data processing means receiving, for example, from a shaft encoder, information as to the speed of rotation of the conveyor.

It will be appreciated that modifications and variations to the configurations particularly described and illustrated are possible within the scope of the present invention.

I claim:

1. A carriage for transporting articles comprising:
 first and second pairs of wheels, the wheels in each pair being arranged coaxially, and the axes of the two pairs being spaced apart and extending substantially parallel to one another; and
 wherein said carriage further comprises a body member arranged to support said first and second pairs of wheels, said body member comprising a top cover member and a skid member connected to said top cover member, and further comprising an open channel defined by said top cover member and extending through said carriage between said first and second pairs of wheels, said channel extending substantially parallel to said axes.

2. A carriage according to claim 1, wherein said skid member defines a skid support surface, said skid support surface protruding downwardly of at least one of the first and second pairs of wheels.

3. A carriage according to claim 2, wherein said skid support surface protrudes downwardly of both pairs of wheels whereby said carriage may be supported on said skid support surface.

4. A carriage according to claim 2 or claim 3, wherein the body member extends from between the first pair of wheels to between the second pair of wheels, and wherein the skid support surface is arranged between the two pairs of wheels.

5. A carriage according to claim 1, wherein the diameter of the peripheral surface of each wheel of each of the pairs of wheels increases outwardly of the carriage.

6. A carriage according to claim 1 or claim 5, wherein the peripheral surface of each wheel of each of the pairs of wheels is serrated.

7. A carriage according to claim 1 or claim 5, wherein the peripheral surface of each wheel of each of the pairs of wheels carries a screw thread.

8. Apparatus for transporting articles comprising:
a plurality of carriages; and
means for moving the carriages along a predetermined direction of movement; and
wherein each carriage includes first and second pairs of wheels, the wheels in each pair being arranged coaxially, and the axes of the two pairs being spaced apart and extending substantially parallel relative to one another and substantially transversely to the direction of movement;
said carriage further comprising a body member arranged to support said first and second pairs of wheels, said body member including a top cover member and a skid member connected to said top cover member, and further comprising an open channel defined by said top cover member and extending through said carriage between said first and second pair of wheels, said channel extending substantially parallel to said axes.

9. Apparatus according to claim 8, wherein said skid member of each carriage defines a skid support surface that protrudes downwardly of at least one of the first and second pairs of wheels.

10. Apparatus according to claim 9, wherein said skid support surface of each carriage protrudes downwardly of both pairs or wheels whereby said carriage may be supported on said skid support surface.

11. Apparatus according to claim 10, wherein, in said carriage, the body member extends from between the first pair of wheels to between the second pair of wheels, and wherein the skid support surface is arranged between the two pairs of wheels.

12. Apparatus for transporting articles comprising:
a plurality of carriages; and
means for moving the carriages along a predetermined direction of movement;
wherein each carriage comprises a first hub member having a first axis, a first pair of wheels arranged on said first hub member, the wheels of said first pair of wheels being arranged coaxially relative to said first axis, and a second hub member being spaced from said first hub member, said first and second hub members being arranged such that said first and second axes are spaced apart and extend substantially parallel relative to one another, wherein a second pair of wheels is arranged on said second hub member, the wheels of said second pair of wheels being arranged coaxially relative to second axis, wherein said wheels of said first and second pairs of wheels have peripheral surfaces, the first and second axes extend substantially transversely relative to the direction of movement and are spaced along the direction of movement; and
wherein said carriage further comprises a body member arranged to support said first and second pairs of wheels, said body member including a top cover member connecting said first and second hub members and a skid member connected to said top cover member, the body member being arranged such that said peripheral surfaces of said wheels of said first and second pair of wheels form article supporting surfaces, and said body member further includes an open channel defined by said top cover member and extending through said carriage between said first and second pairs of wheels, said channel extending substantially transversely relative to said direction of movement.

13. Apparatus according to claim 12, wherein, in each said carriage, the diameter of the peripheral surface of each wheel of each of the pairs of wheels increases outwardly of the carriage, and wherein the peripheral surface of each wheel of each of the pairs of wheels is serrated.

14. Apparatus according to claim 12, further comprising support means over which the carriages are arranged to be moved.

15. Apparatus according to claim 14, wherein said support means comprise at least one support selectively movable from a position supporting selected carriages to a second position in which said carriages are unsupported.

16. Apparatus according to claim 14, wherein said support means comprise support members arranged to contact said wheels of the carriages to cause rotation thereof.

17. Apparatus according to claim 16, wherein said support members include elongate support members extending in the direction of movement, selected wheels of the carriages being arranged to run along said elongate support members.

18. Apparatus according to claim 12, wherein said means for moving the carriages comprises a plurality of axles extending substantially transversely to the direction of movement and means for moving said axles, said carriages each being coupled to one of said axles for movement therewith.

19. Apparatus according to claim 18, wherein one of said first and second hub members of each carriage is pivotably mounted on one of said axles.

20. Apparatus for transporting articles comprising:
a plurality of carriages;
means for moving the carriages along a predetermined direction of movement; and
support means over which the carriages are arranged to be moved,
wherein each carriage comprises first and second pairs of wheels, the wheels in each pair being arranged coaxially, and the axes of the two pairs extending substantially transversely to the direction of movement and being spaced along the direction of movement, and a skid member for supporting said first and second pairs of wheels, the skid member being arranged such that the peripheral surfaces of the wheels form article supporting surfaces, and such that a channel extending substantially transversely to the direction of movement extends through the carriage between the two pairs of wheels, wherein said support means comprise support members, one or more of which is movable, arranged to contact said wheels of the carriages to cause rotation thereof.

21. Apparatus according to claim 20, wherein the movable support members include moving band conveyors.

22. Apparatus for transporting articles comprising:
a plurality of carriages; and
means for moving the carriages along a predetermined direction of movement including a plurality of axles extending substantially transversely to the direction of movement and coupled to at least one endless chain to form an endless conveyor, and means for moving said axles; and
wherein a plurality of said carriages are pivotally mounted on each axle, the carriages carried by each axle being spaced along the respective axle across the width of the conveyor;
wherein each said carriage comprises first and second pairs of wheels, the wheels in each pair being arranged coaxially, the axes of the two pairs extending substantially transversely to the direction of movement and being spaced along the direction of movement, and a skid member for supporting said first and second pairs of wheels, the skid member being arranged such that peripheral surfaces of the wheels form article supporting surfaces, and such that a channel extending substantially transversely to the direction of movement extends through the carriage between the two pairs of wheels.

23. Apparatus according to claim 22, wherein the first pair of wheels of each carriage is pivotably mounted on one said axle.

24. Apparatus according to claim 22, further comprising support means for supporting the carriages as they are moved thereover, and wherein at least one opening is formed in said support means over which a plurality of longitudinally extending, transversely spaced support fingers are provided, each finger being movable between an extended position in which it supports a respective carriage, and a retracted position in which the respective carriage is free to pivot relative to its axle.

25. Apparatus according to claim 24, wherein said support fingers are arranged to cooperate with at least one flap which is movable between a support position in which it extends over said opening and a withdrawn position.

26. Apparatus according to claim 8 or claim 12, wherein each carriage has a cover member which extends between said first and second pairs of wheels and over the skid member.

27. Apparatus according to claim 12, further comprising support means for the carriages, the support means comprising a plurality of elongate support members spaced across the transverse extent of the conveyor, the spacing between adjacent support members being large enough to receive the skid member of a respective carriage such that the wheels of that carriage run along two spaced adjacent support members.

28. Apparatus for transporting articles comprising:
a plurality of carriages;
support means for supporting the carriages; and
means for moving the carriages along a predetermined direction of movement;
wherein each carriage comprises first and second pairs of wheels, the wheels in each pair being arranged coaxially, and the axes of the two pairs extending substantially transversely to the direction of movement and being spaced along the direction of movement, and a skid member for supporting said first and second pairs of wheels, the skid member being arranged such that peripheral surfaces of the wheels form article supporting surfaces, and such that a channel extending substantially transversely to the direction of movement extends through the carriage between the two pairs of wheels; and
wherein said support means comprises a plurality of elongated support members spaced across the transverse extent of the conveyor, alternate ones of the support members being fixed and the others of the support members being movable, wherein spacing between adjacent support members is large enough to receive the skid member of a respective carriage such that the wheels of that carriage run along two spaced adjacent support members.

29. Apparatus for carrying and enabling rotation of articles, said apparatus comprising;
at least one carriage, each carriage including first and second pairs of wheels, the wheels in each pair being arranged coaxially, and the axes of the two pairs being spaced apart and extending substantially parallel relative to one another, and wherein said carriage further comprises a body member arranged to support said first and second pairs of wheels, said body member comprising a top cover member and a skid member connected to said top cover member;
support means for supporting each carriage on said apparatus; and
means for moving each carriage over said support means such that said first and second axes extend transversely to the direction of movement of said carriage, said support means comprising a plurality of surfaces arranged to contact said wheels of said first and second pairs of wheels; said wheels of said first and second pairs of wheels having peripheral surfaces, wherein said peripheral surfaces of said wheels are one of serrated, and screw threaded, and wherein one or more of said wheels of said first and second pairs of wheels is arranged to contact a surface during movement of said carriage over said support means, whereby rotation is imparted to the wheel or wheels contacting the surface.

30. Apparatus according to claim 29, wherein the means for moving the carriages comprises at least one axle extending substantially transversely to the direction of movement, along which the carriages are spaced, and to which the carriages are coupled, wherein said support means comprises a plurality of transversely spaced elongate support members defining said surfaces, the spacing between adjacent support members being large enough to receive the skid member of a respective carriage such that the wheels of that carriage run along two spaced adjacent support members.

31. Apparatus for carrying and enabling rotation of articles, said apparatus comprising:
at least one carriage having first and second pairs of wheels with first and second axes respectively, the wheels in each pair being arranged coaxially, and the axes of the two pairs being substantially parallel and spaced apart, and a skid member for supporting said first and second pairs of wheels;

support means for each carriage comprising a plurality of transversely spaced elongate support members, alternate ones of the support members being fixed and the others of the support members being movable, the spacing between adjacent support members being large enough to receive the skid member of a respective carriage such that the wheels of that carriage run along two spaced adjacent support members; and means for moving each carriage over said support means comprising at least one axle extending substantially transversely to the direction of movement, along which the carriages are spaced, and to which the carriages are coupled; wherein at least one of surfaces of the wheels is one of serrated, and screw threaded, and wherein one or more of the wheels of each carriage is arranged to contact the support means during the movement of the carriage thereover whereby rotation is imparted to the contacted wheels.

* * * * *